US011803861B2

(12) United States Patent
Roebuck

(10) Patent No.: US 11,803,861 B2
(45) Date of Patent: Oct. 31, 2023

(54) SYSTEM AND METHOD FOR MATCHING A CUSTOMER AND A CUSTOMER SERVICE ASSISTANT

(71) Applicant: HRB Innovations, Inc., Las Vegas, NV (US)

(72) Inventor: Eric R. Roebuck, Shawnee, KS (US)

(73) Assignee: HRB Innovations, Inc., Wilmington, DE (US)

( * ) Notice: Subject to any disclaimer, the term of this patent is extended or adjusted under 35 U.S.C. 154(b) by 554 days.

(21) Appl. No.: 15/861,082

(22) Filed: Jan. 3, 2018

(65) Prior Publication Data

US 2019/0205891 A1    Jul. 4, 2019

(51) Int. Cl.
| | |
|---|---|
| *G06Q 30/016* | (2023.01) |
| *G06Q 10/0631* | (2023.01) |
| *G06Q 10/0639* | (2023.01) |
| *H04L 67/306* | (2022.01) |
| *H04M 3/523* | (2006.01) |
| *G06F 16/95* | (2019.01) |
| *H04L 67/14* | (2022.01) |
| *G06F 16/335* | (2019.01) |

(Continued)

(52) U.S. Cl.
CPC ......... *G06Q 30/016* (2013.01); *G06F 16/335* (2019.01); *G06F 16/95* (2019.01); *G06Q 10/06398* (2013.01); *G06Q 10/063112* (2013.01); *H04L 67/14* (2013.01); *H04L 67/306* (2013.01); *H04L 67/535* (2022.05); *H04L 67/54* (2022.05); *H04M 3/5233* (2013.01)

(58) Field of Classification Search
CPC ......... G06Q 30/016; G06Q 10/063112; G06Q 10/06398; H04L 67/14; H04L 67/24; H04L 67/22; H04L 67/306; G06F 16/335; G06F 16/95; H04M 3/5233
USPC ........................................................ 705/304
See application file for complete search history.

(56) References Cited

U.S. PATENT DOCUMENTS

| | | | | | |
|---|---|---|---|---|---|
| 5,970,065 | A | * | 10/1999 | Miloslavsky | ........... H04L 12/64 |
| | | | | | 370/352 |
| 5,999,908 | A | * | 12/1999 | Abelow | ............. G06Q 10/0639 |
| | | | | | 705/7.32 |

(Continued)

FOREIGN PATENT DOCUMENTS

| | | | | | |
|---|---|---|---|---|---|
| WO | WO-0203292 A2 | * | 1/2002 | ......... | G06Q 10/0631 |

OTHER PUBLICATIONS

Tehrani, Rich, Hide KWIC Preview "Cloud, mobile & social and the customer experience", Customer 32.8: 4(1). Technology Marketing Corporation. (Oct. 2014 (Year: 2014).*

Fleischer, Joe and Hollman, Lee, "Shooting Beyond the Baseline", EETimes, May 6, 2002, https://www.eetimes.com/shooting-beyond-the-baseline/?utm_source=eetimes&utm_medium=relatedcontent (Year: 2002).*

*Primary Examiner* — Lynda Jasmin
*Assistant Examiner* — Rebecca R Novak
(74) *Attorney, Agent, or Firm* — Erise IP, P.A.

(57) ABSTRACT

Matching a customer with a representative is performed for assisting the customer with an issue. Information related to the customer, the issue, historical information, and other customer information may be used to determine a likely issue. A representative may be selected in real-time to assist the customer in resolving the issue based on the customers experience in resolve the same or similar issues to the likely issue and the information related to the customer and the representative may be updated dynamically in real-time.

20 Claims, 6 Drawing Sheets

(51) Int. Cl.
*H04L 67/54* (2022.01)
*H04L 67/50* (2022.01)

(56) References Cited

U.S. PATENT DOCUMENTS

| | | | | |
|---|---|---|---|---|
| 6,014,634 A * | 1/2000 | Scroggie | G06Q 20/12 | 705/14.25 |
| 6,615,240 B1 * | 9/2003 | Sullivan | G06Q 30/02 | 709/205 |
| 6,798,876 B1 * | 9/2004 | Bala | H04M 3/5233 | 379/265.12 |
| 6,999,990 B1 * | 2/2006 | Sullivan | G06Q 30/02 | 709/205 |
| 7,287,044 B2 * | 10/2007 | Wilmot | G06F 16/27 | |
| 7,707,149 B2 * | 4/2010 | Lee | G06F 16/20 | 707/999.01 |
| 7,720,690 B2 * | 5/2010 | Patrick | G06Q 30/016 | 705/1.1 |
| 8,271,402 B2 * | 9/2012 | Fisher, Jr. | G06N 5/02 | 706/12 |
| 8,396,719 B2 * | 3/2013 | Patrick | G06Q 30/016 | 705/1.1 |
| 8,411,841 B2 * | 4/2013 | Edwards | G06Q 30/02 | 379/265.05 |
| 8,548,157 B2 * | 10/2013 | Brandt | H04M 3/523 | 379/266.03 |
| 9,112,975 B2 * | 8/2015 | Sayko | H04M 3/5191 | |
| 9,392,114 B1 * | 7/2016 | Bobowski | H04M 3/5175 | |
| 9,503,581 B2 * | 11/2016 | Sayko | H04M 3/5191 | |
| 9,628,623 B2 * | 4/2017 | Vymenets | H04M 3/5175 | |
| 9,648,171 B1 * | 5/2017 | Eftekhari | H04M 3/5232 | |
| 9,706,050 B2 * | 7/2017 | Kumar | H04M 3/5166 | |
| 9,922,649 B1 * | 3/2018 | LoRe | G10L 15/22 | |
| 10,025,604 B2 * | 7/2018 | Fisher, Jr. | G06Q 30/02 | |
| 11,068,904 B1 * | 7/2021 | Langley | H04M 3/5133 | |
| 2002/0161600 A1 * | 10/2002 | Stubiger | G06Q 30/02 | 705/304 |
| 2003/0195753 A1 * | 10/2003 | Homuth | G06Q 30/02 | 379/266.01 |
| 2006/0062374 A1 * | 3/2006 | Gupta | H04M 3/5232 | 379/265.06 |
| 2009/0122972 A1 * | 5/2009 | Kaufman | H04M 3/5125 | 379/265.12 |
| 2010/0332287 A1 * | 12/2010 | Gates | G06Q 30/02 | 705/7.32 |
| 2011/0270770 A1 * | 11/2011 | Cunningham | G06Q 10/10 | 705/304 |
| 2012/0051537 A1 * | 3/2012 | Chishti | H04M 3/5233 | 379/265.11 |
| 2012/0101873 A1 * | 4/2012 | Lepore | G06Q 10/06398 | 705/7.42 |
| 2012/0320903 A1 * | 12/2012 | Ilagan | G06Q 30/01 | 370/352 |
| 2013/0036062 A1 * | 2/2013 | Natarajan | G06Q 10/00 | 705/304 |
| 2013/0185215 A1 * | 7/2013 | Patrick | G06Q 30/016 | 705/304 |
| 2014/0052645 A1 * | 2/2014 | Hawes | G06Q 30/016 | 705/304 |
| 2014/0171034 A1 * | 6/2014 | Aleksin | G06Q 30/016 | 455/414.1 |
| 2014/0270133 A1 * | 9/2014 | Conway | H04M 3/5233 | 379/265.1 |
| 2014/0365255 A1 * | 12/2014 | Burgess | G06Q 30/016 | 705/7.14 |
| 2015/0147999 A1 * | 5/2015 | Venezia | H04W 24/04 | 455/405 |
| 2015/0201078 A1 * | 7/2015 | Khouri | H04M 3/5232 | 379/265.12 |
| 2015/0254675 A1 * | 9/2015 | Kannan | G06Q 30/02 | 705/304 |
| 2016/0189164 A1 * | 6/2016 | Tolksdorf | G06Q 30/016 | 705/304 |
| 2016/0191712 A1 * | 6/2016 | Bouzid | H04M 3/5232 | 379/265.12 |
| 2017/0017964 A1 * | 1/2017 | Janefalkar | H04M 3/5133 | |
| 2017/0154340 A1 * | 6/2017 | Ballepu | G06Q 30/016 | |
| 2017/0178145 A1 * | 6/2017 | Adrian | G06F 16/9535 | |
| 2017/0346948 A1 * | 11/2017 | Wolf | H04M 3/5166 | |
| 2019/0058744 A1 * | 2/2019 | O'Connor | H04L 65/4007 | |

* cited by examiner

| NAME | SCORE | AVAILABILITY |
|---|---|---|
| Jon | 97 | 15 min |
| Julie | 92 | 12 min |
| Ross | 88 | 3 min |
| Mark | 87 | 8 min |
| Sarah | 83 | 10 min |

| NAME | INVESTMENTS | RETIREMENT | ASSETS |
|---|---|---|---|
| Jon | 89 | 84 | 67 |
| Julie | 42 | 76 | 88 |
| Ross | 76 | 78 | 91 |
| Mark | 95 | 82 | 89 |
| Sarah | 91 | 95 | 79 |

FIG. 6

SYSTEM AND METHOD FOR MATCHING A CUSTOMER AND A CUSTOMER SERVICE ASSISTANT

RELATED APPLICATIONS

Embodiments and/or features of the invention described in the present document may be used with the subject matter disclosed in commonly assigned and previously filed U.S. patent application Ser. No. 15/475,445, filed on Mar. 31, 2017, and entitled "USER ANALYTICS FOR INTERVIEW AUTOMATION." The previously filed application is hereby incorporated by reference in its entirety into the present application.

BACKGROUND

1. Field

Embodiments of the invention generally relate to matching a customer and a representative. More specifically, matching, in real time, a customer that has an issue with a representative that has experience resolving the issue, to assist in the resolution of the issue.

2. Related Art

Traditionally, customers reaching out for customer assistance may answer a series of questions then wait for an available representative. The call routing system may relay the customer to a pool of representatives that know nothing of the issue the customer is having. The representative that receives the call may also not be equipped to resolve the issue. Once in contact with the representative, the customer answers basic questions. On average this correspondence lasts one-and-a-half to two minutes. Once the representative understands the issue the representative may continue to assist the customer or may relay the customer to a different call center section that may be available for these types of problems. At the different center, the representative that receives the call may again not have experience resolving with the issue the customer is experiencing. The current system is inefficient, time consuming, and frustrating for the customer.

What is needed is a system that efficiently connects a customer with a representative equipped to handle the issue that the customer is having. There is a need for a method of profiling a customer, evaluating a likely issue the customer is having, and matching the customer with the most qualified representative to resolve the issue in real time. Using the customer profile questions may be tailored to that customer reducing or eliminating the number of questions asked. The selected representative would also know the likely issue the customer is having therefore reducing the number of questions or the number of representatives the customer speaks with. Using this system and method reduces the time and complexity of the customer service interaction for the customer and increases customer satisfaction.

SUMMARY

A first embodiment of the invention addresses the above-described need by providing for a system that matches a customer with a representative for providing support to the customer. The system receives customer information and issue-related information the customer is having via a graphical user interface and stores the customer's interactions with the graphical user interface. The system determines a likely issue the customer is having using the customer information, issue-related information, and the customer's interactions with the graphical user interface. The system selects a representative to support the customer based at least in part on the representative's experience in resolving issues the same as or similar to the determined likely issue.

A second embodiment of the invention addresses the above-described need by providing a method for matching a customer and a representative for providing support to the customer. A customer profile is created based at least in part on the customer information and the issue-related information. A likely issue is determined based at least in part on the customer profile. A representative to support the customer is selected from a plurality of representatives based at least in part on the representative's experience in resolving issues that are the same as or similar to the likely issue the customer is having.

A third embodiment of the invention provides for a non-transitory computer-readable media storing computer-executable instructions that, when executed by a processor, perform a method for matching a customer to a representative for providing support to the customer. Issue-related information and customer information is received. A customer profile is created based at least in part on the customer information. The customer profile is updated with issue-related information and information related to other customers with similar information. A likely issue the customer is having is determined based on the customer profile. The customer is placed in communication with the representative that has been selected from a plurality of representatives based on the experience of the representative in resolving the same or similar issues to the likely issue.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein:

FIG. 6 depicts an exemplary representative ranking system for embodiments of the invention.

Figure 1:
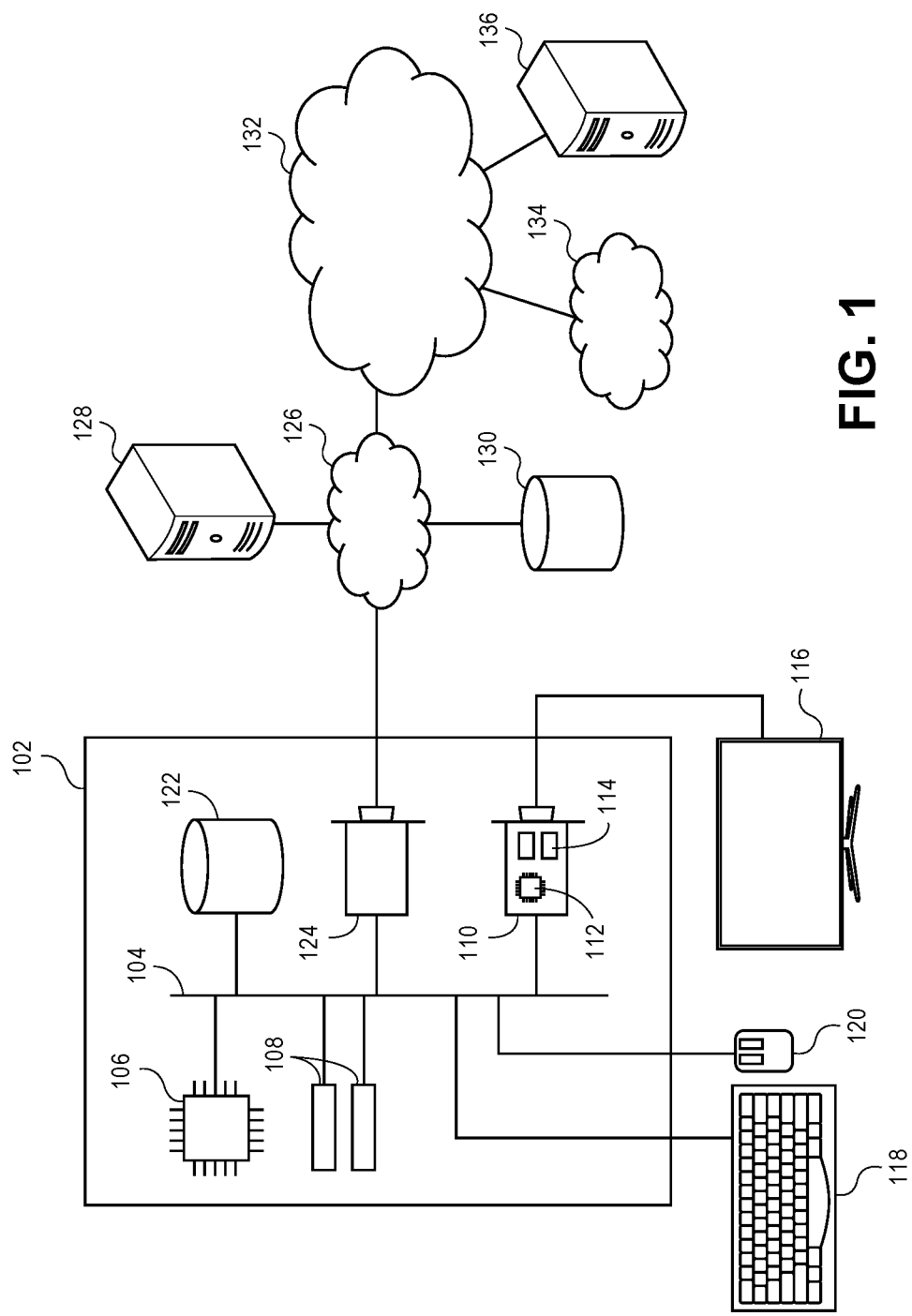
FIG. 1 depicts an exemplary hardware platform for certain embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

At a high level, embodiments of the invention relate to a system and method that matches a customer that may be having issues with a product with a representative that may represent the company that produces the product, the representative having experience resolving the same or similar issues. The customer may provide relevant information about the customer and the issues by answering questions and providing remarks. The system may use the information provided as well as information related to other customers, trends, statistics, online databases, social media, historical information related to the customer and the product, information related to the customer interaction with the product, or any other information that may aid in the prediction of a likely issue. All or any of this information may be used to create a customer profile that may be updated dynamically in real time throughout the process.

The representative may be selected to assist the customer based at least in part on experience, the customer profile, technical difficulties, the likely issue to be resolved, the success the representative has in resolving the same or similar technical difficulties or issues, the time since the representative handled the same or similar technical difficulties, the success rate of other representatives in solving the same or similar technical difficulties, how closely related the issue and similar issues the representative has experience resolving, and the representatives average time to resolve the same or similar issues compared to the overall average time to resolve the same or similar issues. The representative may also be chosen based on feedback from the customers. A customer satisfaction score may be provided by the customer and the score, along with the information provided above, may be added to a representative profile.

The evaluation leading to selecting the representative may be a weighting system where all criteria are weighted for each representative and compared to easily determine the representative that may be best for resolving the customer issue as well as the availability of the representative. An overall score based at least in part on the weighting system may also be given to the representatives to compare. This information may be stored as a representative profile in which any and all information may be used to match a representative with a customer. Any combination of the information provided above, and any other information related to a customer and a representative that may be useful, may be used to match a customer and a representative. The system may match the customer with a representative using a precise mathematical method that may increase efficiency and overall customer satisfaction.

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments, but is not necessarily included. Thus, the technology can include a variety of combinations and/or integrations of the embodiments described herein.

Turning first to FIG. 1, an exemplary hardware platform for certain embodiments of the invention is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also, attached to system bus 104 are one or more random-access memory (RAM) modules. Also, attached to system bus 104 is graphics card 110. In some embodiments, graphics card 104 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also, connected to system bus 104 is local storage 122, which may be any form of computer-readable media, and may be internally installed in computer 102 or externally and removeably attached.

Computer-readable media include both volatile and non-volatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-usable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

Figure 2:
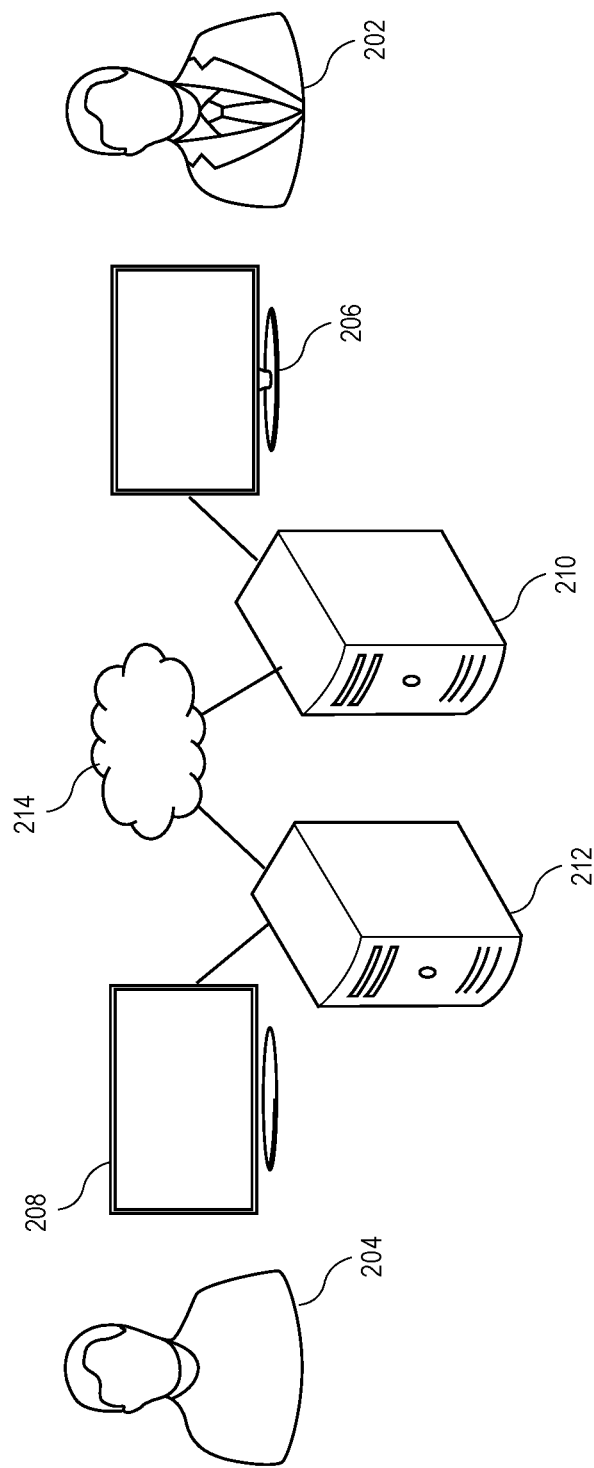
FIG. 2 depicts an embodiment of a hardware platform connecting a customer and a representative.

Turning now to FIG. 2, another exemplary computer platform suitable for practicing embodiments of the invention is depicted and referred to generally by reference numeral 200. As depicted, representative 202 and customer 204 are reviewing information from computer systems 210 and 212 on their respective displays 206 and 208. Conventionally, multiple displays attached to computer system 212 would be controlled by a single user and display either identical information or completely different information. However, the system may provide for joint control. The customer 204 may edit fields on the customer user interface and the representative 202 may edit fields on the representative interface. The representative 202 may have control, the customer 204 may have control, or the customer 204 and the representative 202 may be able to edit the fields. The information displayed on representative display 206 may be the same as, similar to, or contain partially the same information as on display 208.

Numerous exemplary fields of use will be briefly discussed. As an exemplary scenario for illustrating the uses of the invention, the customer 204 may be a patient filling out health history information prior to a doctor's visit and a particular nurse may be assigned based on the patient input. Alternatively, the customer 204 may be a student taking an online class with an online user interface where the student may access, or complete assignments, and may request assistance. If the student is having technical difficulties the student may be placed in contact with a technical support analyst that has experience resolving the likely issue the student is facing. The student may also have a question with a particular assignment and be placed in contact with a teacher assistant that may be handling the assignment. Similarly, representative 202 may be a lawyer, accountant, tax representative, mechanic, customer support representative, assistant or member of any other profession with customer 204 being the corresponding client. Alternatively, representative 202 and customer 204 may be peers. Accordingly, the customer 204 may be a student, patient, client, or any other person that may receive any sort of product or service.

Devices such as computers and displays may be paired in a number of ways. The Internet Protocol (IP) address or domain name of a computer may be used when signing in over a network 214 which may be network 126. This address or name may be used to identify a computer and allow preset login information. A login may be required, in which case a computer associated with the display 206 is then matched with a computer associated with the display 208 used by the customer 204, according to preferences submitted by the customer 204, or the representative 202, or as matched by the embodiments of the invention. The match may be made according to the customer 204 inputs and information described in embodiments of the invention to provide the best service. The information may be stored in memory 114 or data store 122 so connection is automatic upon login by either the representative 202 or the customer 204. It also may be beneficial for the computers or displays to connect remotely. The device used by the customer 204 may be a personal computer or a personal mobile device.

Throughout a portion of the below description, taxes are discussed as an exemplary field of use for consistency and clarity to the reader. The customer 204 may log into a computer, tablet, phone or any other personal electronic device capable of running the software application, and set up an account. The account may be associated with the customer 204 and accessible with a password, retinal scan, fingerprint identification or other method of identity verification. The customer 204 may save personal information on the account such as address, telephone number, social security number, or any other personal information that may be required or necessary for the application. The information needed may relate directly to the application presenting the user interface. The information may be related to medical information at a doctor's office, legal information, tax information, automotive service information, or any other service that may be accessible via user interface. The software may then set up a customer profile where any new information that may be useful in determining a likely issue or a representative 202 to assist the customer 204 may be added to the profile in real time. The profile or any information related to the customer, the likely issue, or the representative may be updated at any time automatically as received by the application.

In embodiments of the invention, information may be gathered via a graphical user interface, phone, email, text, online though social media or online databases or any data gathering device. Prediction of a customer issue and evaluation of a representative to assist the customer may be evaluated through use of any of the above stated information.

In embodiments of the invention, the customer 204 may not be using any of these device at all. The customer 204 may be using a telephone and answering questions on an automated service, talking to a representative 202, or meeting a representative 202 face to face. In this scenario, the representative 202 may be inputting the information into the GUI for selection of a representative 202 or the customer 204 voice may be recorded, recognized, and converted into usable data and used to determine a likely issue and match a representative 202.

Figure 3:
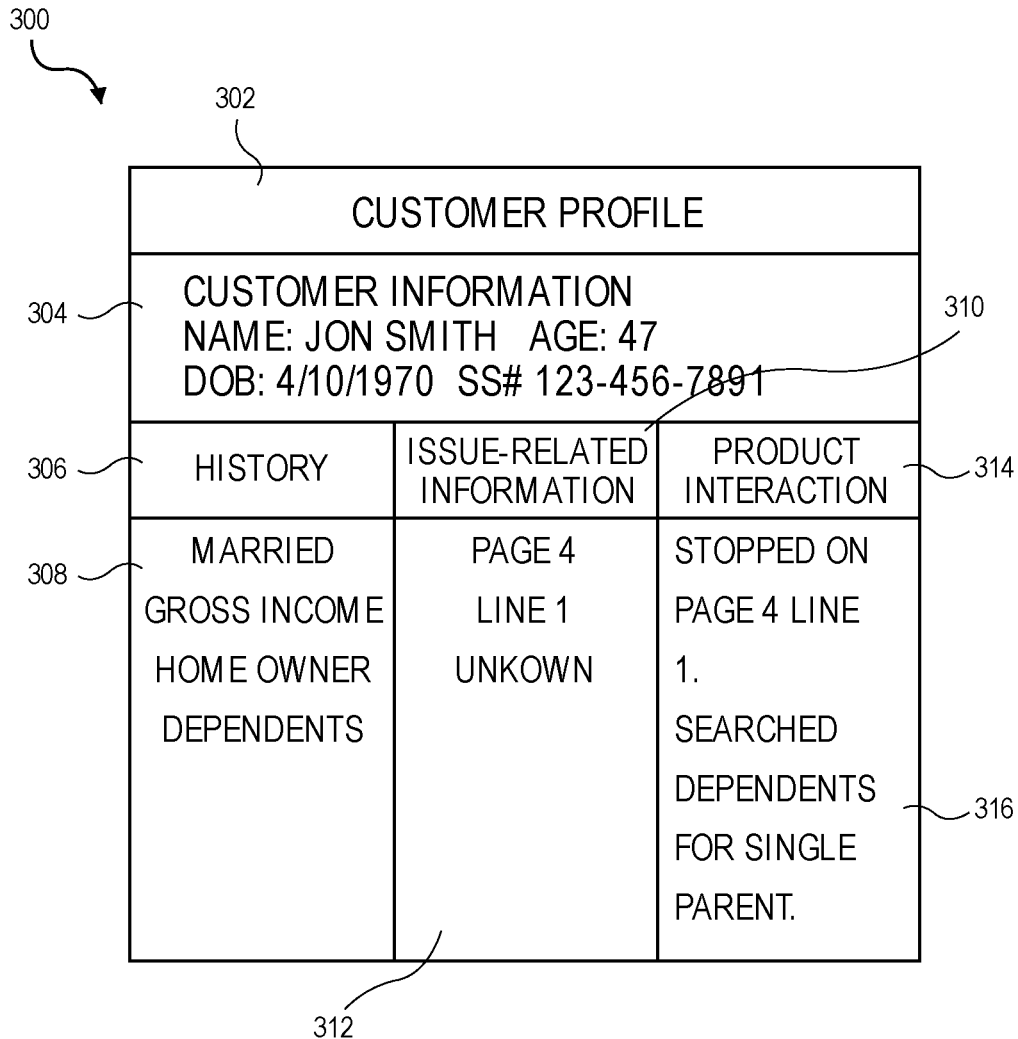
FIG. 3 depicts an exemplary customer profile for use in embodiments of the invention.

FIG. 3 depicts an exemplary table 300 representing a customer profile 302. When the customer 204 logs on a set of initial questions may be presented. The initial questions may be presented when the customer 204 logs on for the first time or in subsequent log ins to update the customer profile 302. The information provided by the customer 204 may be stored as customer information 302 and be compared to other customers or to online databases to generate a profile for the customer 204. The customer profile 302 may include information based on information from customers with similar responses to initial questions or similar customer histories. For example, the customer 204 may be 47 years old living in Kansas City Kansas and married with two children. Based on the demographics a benefit estimate may be initially made related to other customer information for customers living in Kansas City Kansas in their 40's with two children. A reduction in initial questions may also be performed based on the information provided or already stored by the application.

The customer profile 302 may also have a history section. This may relate to any historical information related to the customer 204 such as purchasing, grocery shopping history, travel history, daily routine, schedule, or any other customer history that may be useful in determining a likely issue and selecting a representative 202. In the particular embodiment exemplified by the table 300, the history is related to tax information. The previous tax information may be used to determine a benefit estimate as well as reduce the number of initial questions asked by the software application. The customer history information 308 and customer information 304 may also help determine the likely issue that the customer 204 may be having.

The customer profile 302 may also contain information related to an issue that the customer may be having. The issue-related information 310 may be obtained through a graphical user interface used by the customer 204 or by the representative 202. The customer 204 may answer questions related to the issue over the phone via an automated question and answer session or through the representative 202 or via the GUI. The customer 204 may text, video chat, chat, email, or relay the issues by any communication method. The issue-related information 310 may be saved in the customer profile 302 and may be used by the representative 202 or may be used to determine a likely issue the customer may be facing.

Figures 4, 5:
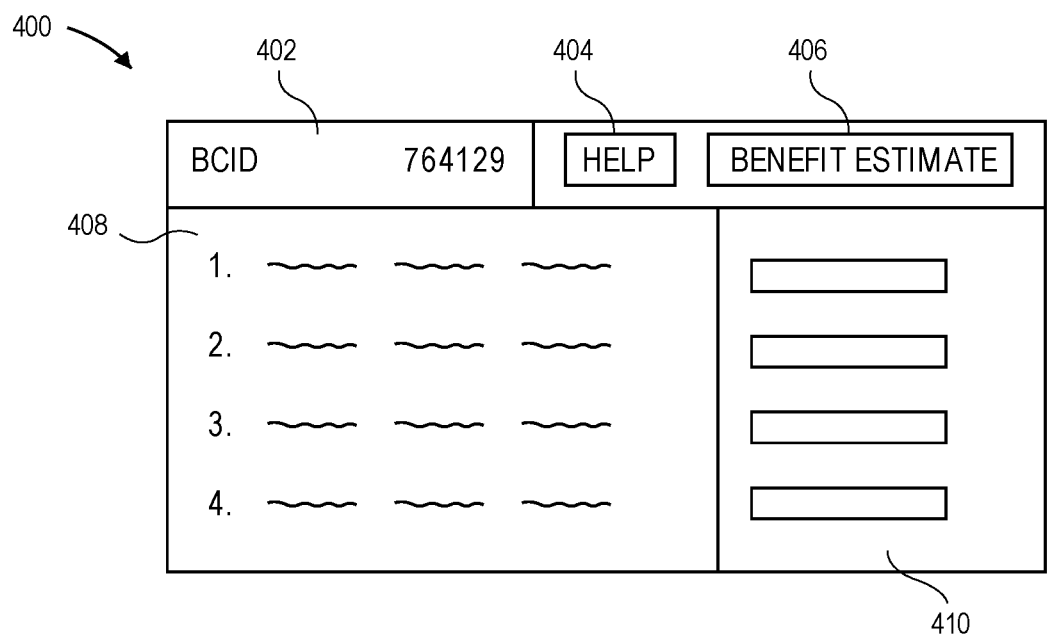
FIG. 4 depicts an exemplary graphical user interface for embodiments of the invention.
FIG. 5 depicts an exemplary representative ranking system for embodiments of the invention.

Continuing with the exemplary embodiment depicted in FIGS. 3 and 4, the product interaction may also be recorded and used by the representative 202 or in determining a likely issue. The product interaction 314 may also be referred to as the customer interactions, or interactions with the GUI 400. The product interaction 314 may be a recorded history of the customer with the GUI 400. The product interaction may also be a recorded history of a telephone conversation or the recorded history of the customer 204 interaction with an automated service. The information provided in these examples may be used to determine a likely issue or used by the representative 202 to resolve the issue.

The customer profile 302 may be updated dynamically with customer provided information or tracking of the customer's product interactions with the GUI 400. The customer profile 302 may be updated and new questions may be provided to the customer 204 based on new trends of other customers that have been deemed by the system to be similar.

Embodiments of the invention may be related to a system and method that matches a customer 204 with a representative 202 that have experience handling a likely issue that a customer 204 may be facing. In an exemplary embodiment depicted in FIGS. 3 and 4, a GUI 400 representing a tax application form may be presented to the customer 204. The GUI 400 may display a customer identification number 402, a help button 404, and a benefit estimation button 406. Lines of questions 408 related to tax information may be presented to the customer 204 as well as response fields 410 for the customer response. The customer 204 may have issues understanding elements of the form or have technical difficulties while filling out the form. The customer 204 may access a help screen by clicking on the help button 404. A list of help options may be presented to the customer 204 to help the customer 204 resolve the issue. As the customer 204 attempts to resolve the issue independently the application may record the customer 204 interaction with the GUI 400. The recorded information may be useful for the application to deduce the issue the customer 204 is having with the GUI 400.

The customer 204 may have an identification number 402 and a recorded history profile 308. The representative 202 may access the customer history 308 from the customer profile 302 using the identification number 402. The identification number 402 may be linked to the customer's online account information such as the customer information 304 or may be a portion of the information that the customer 204 has allowed the representative 202 to view. The customer profile 302 and any information related to the customer 204 may be dynamically updated by the customer product interactions 314 with the GUI 400, or other customer's interactions, or may be manual edited by the customer 204 or the representative 202. The customer information that is provided to the representative 202 may be information deemed necessary based on the likely issue, the page that the customer 204 is editing, the information that the customer 204 has entered, or the recorded history of the customer 204 interaction with the GUI 400.

In an exemplary scenario, the customer 204 may log in or sign in to the application using a password or the identification number 402. The customer 204 may fill out the tax form depicted in FIG. 4 on GUI 400. The customer 204 may respond to the questions in the response fields 410. While filling out the form the customer 204 may run into issues. The issues may be a lack of understanding, or an incorrect value was saved in a response field 410, or technical issues. As an example the issue may be on page 4 line where as depicted in field 316 FIG. 3. This information may be stored in the customer profile 302. The customer 204 may select the help button 404. Upon selecting the help button 404, the customer 204 may be presented with a window outlining help suggestions and a field to search for issues. The customer 204 may browse the help section searching to resolve the issue. The customer 204 may also be presented with question to help determine the problem and possible courses of action to solve the problem. The customer 204 may go through a process of trying to solve the problem. While the customer 204 is attempting to solve the problem, the application may store the interactions of the customer 204 with the GUI. The information related to the customer 204 responses to the questions to help solve the problem and the data stored indicative of the customer interaction with the GUI may provide data indicative of the issue the customer 204 is facing to the application, storing the data for use in determining a likely issue. Continuing with the example the customer 204 types "dependents for single parent" into the search bar. This information is then stored and added to the customer profile 302.

The customer 204 may not be able to find a solution and calls, emails, texts, video chat, chat, or in any other way may contact customer support. The system uses the information gathered from the customer 204 and makes the customer profile 302. The customer profile 302 may include customer information 310 age, name, location, and use this information with online social information and demographics. The customer information 310 may be general information indicative of the customer 204. In this particular example, the customer profile 302 history section 306 may include tax related information such as marital status, dependents, home owner, gross income, and previous tax filing information.

The profile may relate the customer 204 to other customers with similar information. The system may use the customer profile 302 information along with the recorded customer 204 product interaction 314 with the GUI 400 to determine the likely issue the customer 204 is having and connect the customer 204 with a representative 202 that has a history of resolving the same or similar issues. Continuing with this example the customer has stopped on line 1 of page 4 and has searched "dependents for single parent". Other customers' profiles are scanned and it is determined that recently separated parents frequently have issue on page 4 line 1. Therefore, based on the customer history 308 stating that the customer is married, the location in which the customer 204 has stopped, the search performed by the customer 204, and the other customers profile information, it is determined that the likely issue may be a recently divorced parent and questions regarding dependents. The customer 204 is put in contact with the representative 202 and the representative 202 quickly and efficiently resolves the issue with a minimal amount of questions and time because the representative 202 has recently resolved the same or similar issues with other customers.

As in the exemplary scenario described above, embodiments of the invention may use a customer's in product behavior, tax complexity, tax situations, and other customer profile information and match the customer 204 in real time with the representative 202 that has previous success resolving issues with other customers that have the same or similar in product behavior, tax complexity, tax situations, and other similar traits.

In embodiments, the customer 204 may provide little information. Any information provided by the customer or known about the customer may be used in finding a representative 202. For example, it may be known that the customer 202 owns a business in Kansas City. A pool of 500 representatives may be reduced to a pool of 20 representatives that have experience with customers of similar background. The reduced pool may be based on other customers that have businesses in Kansas City. The reduced pool may be based on tax information in Kansas or Missouri, or owning a business in the Midwest. Any information may be used in reducing a large pool of representatives to a smaller pool for further evaluation or selection.

At any time during the process of filling out the form on the GUI 400, the customer 204 may select the benefit estimate button 406. The benefit estimate button 406 may use all the information from the customer profile 302, other customers' profiles, online databases, and any other information saved for calculating an estimated benefit for the customer 204.

While the exemplary embodiment represented in FIGS. 3 and 4 is related to tax information, embodiments of the invention may be useful in other fields such as medicine, insurance, education, finance, ecommerce, shopping, or any other field that may find embodiments of the invention useful. The benefit estimate may, in alternative embodiments, also be a cost estimate using the same or similar factors as described above. In embodiments, the factors may be any information provided in the customer information, history, issue-related information, product interaction, information related to other customers, information in the customer profile 302, or any other information that may be useful in determining a representative to assist the customer 204.

The exemplary embodiment depicted in FIG. 5 is a representative scoring table 500 used to evaluate a representative to be matched with the customer 204. Depicted in the table in FIG. 5 is the representatives' names 502, scores 504, and availability 506. In the table depicted in FIG. 5, there are five representatives listed. The five representatives listed may be chosen from a larger pool of representatives. The five representatives listed may be based on any information from the customer profile 302. Any information may be used to reduce a large pool of representatives to a smaller pool for further evaluation or selection.

Continuing with the embodiment depicted in FIG. 5, the scores 504 may be based on a past success in solving the same or similar issues that the customer 204 may be having. The scores 504 may also be based on a weighting system that allows a group of representatives to be compared based on weighting factors such as success in solving the same or similar issues, time since last experience with same or similar issues, frequency of helping customers with the same or similar issues, customer satisfaction provided by previously helped customers, length of time to resolve issues, level of difficulty of issues solved, availability, and efficiency of the representative in solving the same or similar issues. These factors may be used in any combination and weighted in any way that may be useful in selecting a representative to resolve a likely issue. These scores 504 or any other factors as described above may also be used to rank the representatives in tiers, or levels.

Though the above embodiments describe a user accessing a graphical user interface 400. Embodiments of the invention may match customers with representatives of companies that are not related to graphical interfaces or technical issues. The issues may relate to automotive maintenance, a doctor visit, the purchase of a defective product, or any other situation where a customer may be in need of support.

As depicted in the exemplary embodiment in FIG. 5, representatives 502 are listed Jon, Julie, Ross, Mark, and Sarah. The representatives 502 listed may not be the entire pool of representatives evaluated to resolve the issue. A larger pool may be reduced to the representatives displayed in FIG. 5. In embodiments, any one of the representatives 502 may be representative 202. The scores 504 may only be representative of the top tier. The threshold for top tier may be a score 504 of 80 in this case. Since a relatively large number of representatives 502 have a score 504 of 80 or higher only the top tier may be evaluated. If only one or two representatives had a top tier score 504 a secondary tier may have been included and representatives from the second tier further evaluated to resolve the issue. The number of representatives in a tier may be a factor in determining how many tiers are used for evaluation. The availability may also be a factor. If all representatives 502 in the top tier are on long calls, based on averages, then tier two may be accessed. This is important since the top tier may most likely be handling the most difficult likely issues. Any information from the customer profile or interaction with the product may be used in determining the representative tiers.

Continuing with the example in FIG. 5, Jon 508 has the highest of all scores 504. Based on the Jon's score, Jon 508 should be the most effective at resolving an issue. However, the wait time for Jon 508 is 15 minutes. The wait time for Ross 510 is 3 minutes and Ross' score is 88. The application may select the first available representative 202 from the list of representative 502 or may wait the full 15 minutes for the highest scoring representative 202. The selection may be based on the difficulty of the issue that the customer 204 is having or may be based on the customer 204 input. The customer 204 may indicate that time is not an issue and would like the best available representative 202 or may indicate that time is more important and therefore the representative 202 may be selected based on the first available, or based on an optimization program maximizing score, minimizing time, or any combination of the two. The programs used for evaluation may be used on any number of factors such as the tier system, to determine the likely issue, to reduce the number of questions presented to the customer 204, or to select a representative 202 from the list of representatives 502. Any algorithm used to determine similar customers or evaluate large databases may be used to determine any other factors as described above or combination of factors in embodiments of the invention.

Another exemplary scenario represented by the embodiment depicted in FIG. 5 may involve a patient (which may be customer 204) with a medical condition. The patient may communicate the symptoms to a medical assistant and the medical assistant may input the information into the GUI 400 or the customer 204 may be presented the GUI 400 and input the information. The patient may fill out the necessary information for the application to perform an analysis and determine an appropriate score 504 for each of the nurses (which may be the list of representatives 502) on duty. The scores 504 may be based on the nurses' recent success in treating patients with similar issues. The patient may indicate that time is important, or the medical condition may dictate that Ross 510 will be available soon, and assign Ross 510 to the patient. The availability may be based on an average time to complete the tasks that the nurses 502 are performing or may be based on the average time for the particular nurse to finish a particular task. The nurses 502 in the exemplary scenario may be hospital representatives 502, and the selected representative, Ross 510, may be the representative 202.

The patient phone number, name, or any other identifying information may be used to identify the patient and provide the patient with immediate questions to streamline the process. The patient information (which may be customer information 304) may be used to predict the likely issue. For example, the patient may have recurring issue such as asthma. The application may provide questions related to asthma. The patient may also be immediately assigned a nurse on duty that has expertise in handling this issue. The patient may be scheduled specifically to a shift when a nurse or doctor that has experience with this issue is working. Alternatively, the issue may be unknown but patients that have been deemed to have similar responses to questions and similar profiles such as other patients with asthma. The application may then predict that the patient may have the same or a similar issues and automatically direct the patient to the nurse with experience resolving the predicted issue. Likely issues may be predicted and questions may be reduced or eliminated based solely on the patient profile (which may be the customer profile 302).

In embodiments, the customer 204 may also be assigned a representative based on customer feedback. The selection of the representative 202 may be based on the customer 204 feedback or feedback from other customers. A customer 204 may be assigned a representative 202 to which the customer 204 has given a positive feedback, or positive customer service rating. Alternatively, the customer 204 may not be assigned a representative to which the customer 204 has given a negative customer service rating. The customer 204 may also be given a representative 202 based on the predicted issue and the customer feedback. In this way, the application may be able to not only select a representative 202 based on the likely issue but also based on the customer's 204 preferences.

Other embodiments may be depicted in FIG. 5. For example, a customer 204 may have ordered a product from an ecommerce site or purchased an item in store and realized the product was defective. The customer 204 calls customer support and answers a series of automated questions. The representatives 502, may be the representatives 502 on duty, and may be rated by experience resolving issues with particular products, brands, types of products, or repairs to products, and the customer 204 is put in contact with the particular representative 202 best equipped to resolve the likely issue, Jon 508. The customer 204 is informed that the product has an online part to solve the problem and Jon 508 orders the part for the customer 204. The issue is resolved quickly and efficiently and the customer 204 gives a customer satisfaction score of 10 out of 10. Jon's profile (which may be the customer profile 302) is then updated with the experience of resolving that particular issue with a customer service score of 10 out of 10. Jon's profile is dynamically updated in real time so that the next time a customer calls with a similar issue Jon's score, rank, weight, or tier related to this issue will be higher. The information related to Jon's experience and resolving issues may be saved in Jon's profile.

The representative 202 best equipped to resolve the likely issue, Jon 508 may not be available. An alternative representative may be chosen from a pool of representatives. If a match between the pool of representatives is not found then a match may be made using the entire pool. Any information provided by the customer may be used to reduce the pool. The customer may have purchased a toy. The pool may be reduced by selecting representatives that have experience with child products. A representative 202 may be selected from the reduced pool based on availability or any other information known about the customer 202.

In another exemplary scenario, the customer 204 may be having car trouble and goes online to a dealer repair shop. After responding to online questions such as vehicle type, mileage, and previous work performed, and creating a customer profile (which may be customer profile 302) the application predicts the vehicle issue based on work performed on the same or similar vehicles or parts. The application also calculates an estimated cost for the service based on average cost for the same or similar repairs in the location of the customer 204 and may provide the estimation to the customer via the GUI 400. The application then places the customer 204 in contact with a mechanic (which may be the representative 202) qualified, or having experience with the likely issue. The vehicle is quickly diagnosed and fixed. The customer 204 provides positive feedback and the mechanic and the automotive store receive a boost in rankings.

An exemplary embodiment depicted in FIG. 6 shows a table 600 evaluation of representatives 602 evaluated on three financial categories: investment scores 604, retirement scores 606, and assets 608. The representatives 602 in this exemplary embodiment are financial officers or accountants. A customer 204 of the financial institution may need help resolving a retirement issue. Based on the data available to the application the most effective representative in resolving retirement issues is Sarah 610. The customer 204 is then scheduled a contact with Sarah 610.

The most effective representative in resolving the issue may be based on a confidence level that the likely issue is in fact the issue. For example, continuing with the embodiment depicted in FIG. 6, Sarah 610 may be selected because she is extremely good at solving retirement issues. This may be based on a 90% confidence level that the issue is a retirement issue. This confidence level may be based on the customer 204 input, recorded customer product interaction 314 with the GUI 400, stored customer information 304, history 306, other customer information deemed to be similar, online databases, or any additional information or factors that may be useful and stored in the customer profile 302. The confidence level may go up based on the response of the customer 204 to questions presented. As the customer 204 responds to the questions the application gains more information and increases the confidence level. The questions asked may be based on the response of the customer 204 to previous questions. If the confidence level is high enough, no question may be asked and a representative 202 may be immediately assigned.

The higher the confidence level the more accurate the application may be in selecting a representative 202 to handle the issue. If a confidence level is 99%, only a few representatives may be options for resolving the issue because these selected representatives are the best at this particular issue. However, if the confidence level is 20%, the issue is virtually unknown, therefore possibly any representative may be well equipped to resolve the issue so no representatives are ruled out. Representatives may be weighted at a low confidence level or there may be a confidence threshold. Below the threshold all representatives are available and the first available representative is assigned.

The representatives may be sorted into tiers based on the representatives' relative experience with the issue to be resolved. For example, continuing with the embodiment depicted in FIG. 6, Sarah 610 and Jon 612 may be considered tier 1 representative candidates. Mark, Ross, and Julie may be considered tier 2 representative candidates. Based on the tier system only Sarah 610 and Jon 612 may be candidates for selection or all may be candidates and only tier 3 representatives omitted from selection. The tier system may be 1, 2, 3, or any number of tiers that may be useful for structuring the system. The tiers may be dynamic and change the number of levels and representatives may be changed based on performance and customer feedback in real time.

The tier system may also expand in general to all representatives and may be based on general experience rather than evaluated per particular issue. This may create a tier 1 based on experience then a sub tier system based on particular issues. For example, Sarah 610 may be the highest-ranking representative based on the sub tier ranking of helping with a particular issue, but Jon 612 may rank higher based on overall experience and time with the company. This allows Jon 612, who has more experience with customers and knowledge of the company to help a customer that may need these representative attributes based on the customer profile 302. In another example, Sarah 610 may not have been able to answer a particular question a week ago, but she went through training or successfully resolved a problem associated with the particular question and moved to new tier based on the new experience. This may have also affected her ranking in a ranking system and weights in the weighting system.

The tier levels as well as the customer 204 and representative 202 attributes may be weighted based on different levels of importance to the customer 204 or in a manner that is most efficient. The tier system may be bypassed if a satisfactory representative 202 is available as determined by the application. The tier system may be used continuously or intermittently based on availability of representatives or time to wait for representatives. Further, whether the tier system is applied or not in individual cases may be based on the customer profile 302.

Figure 7:
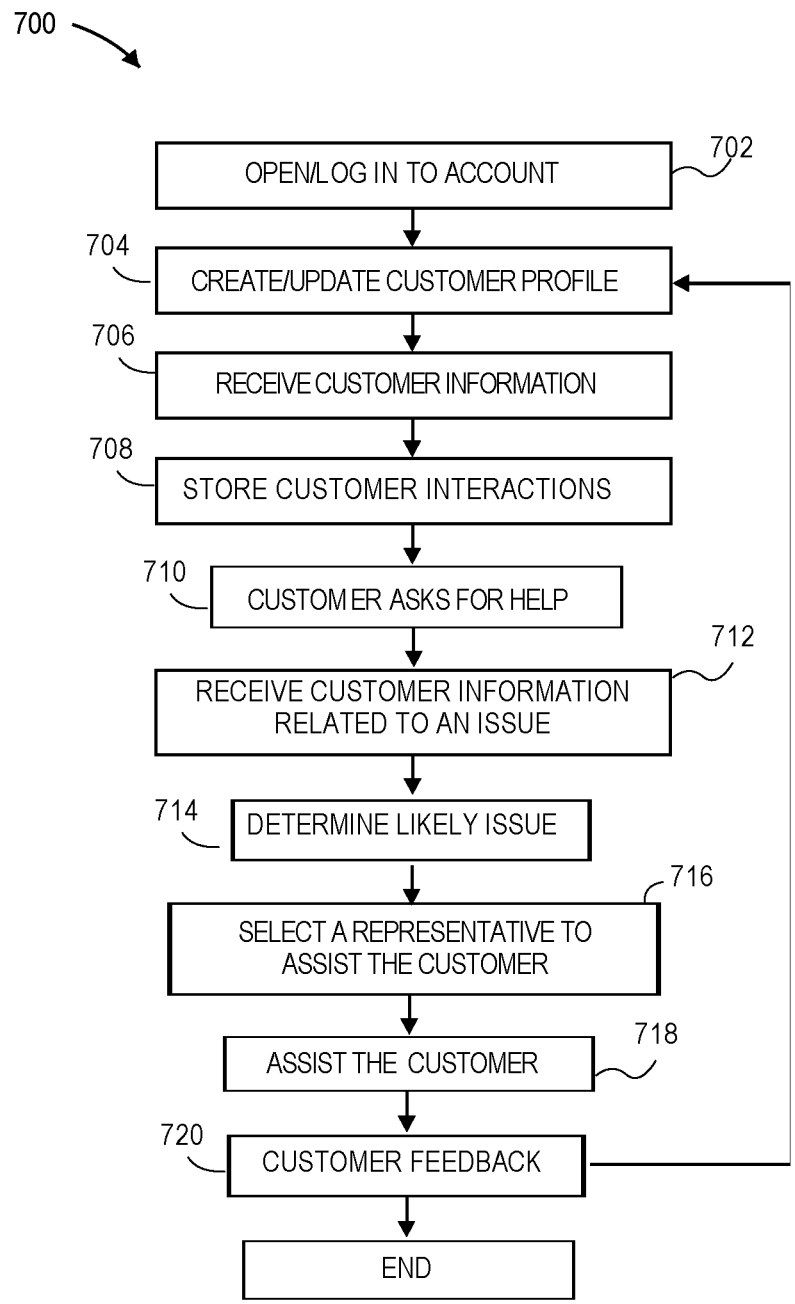
FIG. 7 depicts an exemplary flow chart representing embodiments of the invention.

An exemplary embodiment of the invention is depicted in the flow chart 700 in FIG. 7. A customer 204 may open an account on a website or locally stored application via a graphical user interface (GUI) 400 in step 702. The account may be accessed with a username and password or with a customer identification number 402.

Moving to step 704, the customer 204 may create profile. Upon creating an account the GUI 400 may present the customer 204 with initial questions. The customer 204 responses may provide embodiments of the invention with information that may be used to create a customer profile 302. The information may be basic information such as the customer 204 name, age, height, weight, nationality, social security number, background information, location, or any other basic information may be useful for the particular embodiment of the invention. The information provided by the customer 204 may be used to create the customer profile 302. Any information received by the customer 204 or through customer 204 interactions with representatives or the GUI may be added to the customer profile 302.

Moving to step 706, the customer 204 may provide additional information. This information may be specific to the embodiment of the invention. For example, if the customer 204 is filling out a tax form, the information may be gross income, home ownership, previous tax reports, or any information related to filling out the particular tax form. In an alternative example, the embodiment may be reporting a defective product purchased. The information provided may be the location of purchase, either online or in store, a receipt number, or a credit card number for tracking the product and purchase of the product. Any of this information may be added to the customer profile 302 in order to determine a likely issue or to determine a representative to be assigned the case and to develop tendencies for the customer 204 and better determine a representative, or likely issue, in future cases. The information provided or otherwise obtained from online databases or other customer profiles may be stored in the history or customer information sections of the customer profile 302.

Moving to step 708, once the customer 204 information is entered, the customer 704 may begin working in the document portion of the GUI 400. The GUI 400 may present questions to the customer 204 and the customer 204 may provide responses in the response fields 410. If the customer 204 encounters an issue the customer 204 may select a help button 404. The issue may be lack of understanding, an error while completing the form, or technical difficulties. The customer 204 may interact with the help menu and help search. The customer 204 interactions with the GUI 400, including all interactions prior to selecting the help button 404 and all interactions after selecting the help button 404, may be recorded. At any point the customer 204 may select the benefit estimate button 406 and receive a benefit estimation based at least in part on the factors identified above.

Moving to step 710, after the customer 204 has exhausted the help search, the customer 204 may decide to contact a representative 202 for assistance. The customer 204 may indicate a desire to communicate and initiate a call, text, email, chat, or video chat. In step 712 the customer 204 may be presented with more questions based on the information that has already been gathered or if a likely issue has already been determined with a high enough confidence level then no more questions may be necessary and the customer 204 may be put in contact with a representative 202 immediately.

Moving to step 714, the information gathered from the customer profile 302, customer information 304, customer's product interactions 314 or with a representative 202, product, or GUI 400, information related to other customers with similar information, information obtained from online databases, social media, any history 306 of the customer 204 or other customers that may also be stored on the customer profile 302, and the customer's information related to the issue 310 may be useful in determining the likely issue. For example, the customer 204 may stop working at page 4 line 15 of the document. The customer 204 may also search dependents. The application may recognize that page 4 line 15 asks for the number of dependents of the taxpayer filling out the form. From this the application may deduce the likely issue is that the customer 204 may not understand the question or know how many dependents to claim. The application may also recognize that the customer profile 302 has the customer 204 listed as married from historical tax information but now the customer 204 is filing single. As judged from other recently divorced customers, this section tends to be a point of confusion. Therefore, the likely issue is labeled with a high confidence since not only is a likely issue determined but a likely cause of the likely issue is determined.

Moving to step 716, the application uses the information gathered, as stated above, and selects a representative 202. For example, the pool of representatives may contain many representatives. Of those representatives only 10 have experience resolving dependent issues in the last month. Of the 10 only 3 have resolved dependent issues that involve a customer that recently changed status from married to single. Of the three with recent experience assisting with the likely issue, two are on calls and one is available. The customer 204 is placed in communication with the available representative 202.

At step 718, the representative 202 assists the customer 204 in resolving the issue. Once resolved, the representative information, and profile, is updated that the representative 202 has resolved the issue. This will help in future representative selection processes.

Moving to step 720, the customer 204 may provide feedback based on the experience. The customer 204 may be provided with questions and remarks. All new information recorded through the interaction as it pertains to the customer 204 may be saved and the customer profile 302 may be updated. All saved information may be used to recognize customer 204 trends and better predict likely issues in the future.

The customer 204 feedback is also used to update the information, or profile, of the representative 202. Positive feedback will give the representative 202 high rankings and high tier levels while negative feedback may affect the relative status of the representative 202 as compared to other representatives. This may aid in future selections of the representative 202.

It should be noted that the flow chart may be in any order as allowed without losing functionality for different embodiments of the invention. Some steps may be combined when it may not be necessary for the steps to be separate. Some steps may be omitted while still allowing embodiments of the invention. For example, a customer account may not be necessary. Embodiments of the invention may provide for a guest to input the necessary information to select a representative 202. The guest may not input personal information however may input specifics of an issue. Embodiments of the invention may still use this information to determine a likely issue and select a representative 202. Alternatively, a customer computing device may not be necessary. The information provided by the customer 204 may be via telephone on an automated system. Further, the information may be communicated from the customer 204 by speaking to a representative that may input the information into a GUI either by phone or face to face.

Any information used in determining the issue as stated above may also be used in calculating a benefit or cost estimation. The benefit or cost estimation may be calculated at any point in the process. The benefit or cost estimation may be a running total and updated dynamically and may continuously or intermittently be displayed to the customer 204 or representative 202.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims. Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A system comprising at least one processor and at least one non-transitory computer-readable media storing computer-executable instructions that, when executed by the at least one processor, perform a method for matching a user with a representative for providing support to the user, comprising:
  receiving user information relating to the user via a graphical user interface;
  receiving issue-related information on a user-experienced issue via the graphical user interface;
  receiving a help button selection from the user in the graphical user interface, the help button selection being responsive to the user encountering a technical difficulty;
  recording a first set of interaction information regarding a first user interaction of the user with the graphical user interface;
  after recording the first set of interaction information, presenting a list of help options to the user through the graphical user interface;
  recording a second set of interaction information regarding a second user interaction of the user with the graphical user interface after receiving the help button selection;
  dynamically updating a user profile of the user based on interaction information comprising the first set of interaction information and the second set of interaction information regarding user interaction with the graphical user interface before and after receiving the help button selection respectively;
  storing, on a storage device, the user information, the issue-related information, and the interaction information related to the user interaction with the graphical user interface;

predicting a predicted issue based on the user profile;
computing a confidence level that the predicted issue is the user-experienced issue;
updating the confidence level based on one or more responses received from the user comprising additional information relating to the user-experienced issue;
determining a likely resolution to the technical difficulty based at least in part on the user information, the issue-related information, the user profile, and the interaction information related to the user interaction with the graphical user interface and the list of help options;
calculating a plurality of representative rankings based at least in part on a first success rate of a plurality of other representatives in resolving similar technical difficulties, an overall average time to resolve the similar technical difficulties, and the confidence level;
identifying one or more representatives in a tier that is above a representative threshold based on the plurality of representative rankings, wherein the tier that is above the representative threshold is indicative of a second success rate of the one or more representatives for resolving the user-experienced issue given the confidence level;
presenting to the user an option to select, in real time, between a highly-ranked representative in the tier that is above the representative threshold and a first-available representative, said first-available representative having a lower wait time than the highly-ranked representative but ranked lower than the highly-ranked representative;
in response to presenting the option, receiving a user input from the user whether to engage with the highly-ranked representative or the first-available representative;
automatically selecting for assignment to the user, a selected representative from the one or more representatives, based on the user input;
receiving user feedback from the user based on a user experience of the user with the selected representative;
updating a representative profile of the selected representative in real time based on a user satisfaction score from the user feedback and a category of the user-experienced issue, including updating a selected representative ranking corresponding to the category of the user-experienced issue based on the user feedback and a length of time to resolve the user-experienced issue; and
further updating the user profile of the user based on the user feedback to improve a future prediction and recognize user trends.

2. The system of claim 1,
wherein the user information, the issue-related information, and the first set of interaction information comprise an indication of the user profile,
wherein the user profile further comprises information received from an online database,
wherein the likely resolution to the technical difficulty is further determined based on the user profile.

3. The system of claim 2, further selecting the plurality of other representatives based at least in part on the user profile.

4. The system of claim 1, wherein selecting the selected representative is based on a first availability of the selected representative compared to a second availability of one or more other representatives that have a known success rate in resolving a similar technical difficulty.

5. The system of claim 1, wherein the representative is a customer service representative.

6. The system of claim 1, wherein a third success rate of the selected representative is based at least in part on a period of time since solving a similar issue to the user-experienced issue.

7. The system of claim 1, wherein a third success rate of the selected representative is based on a weighting system that compares the representative to one or more other representatives.

8. A computerized method for matching a user with a representative for providing support to the user, comprising:
receiving issue-related information on user-experienced issue regarding use of a software application having a graphical user interface;
receiving user information;
creating a user profile based at least in part on the user information;
updating the user profile with the issue-related information;
receiving a help button selection from the user in the graphical user interface, the help button selection being responsive to the user encountering a technical difficulty;
presenting a list of help options to the user through the graphical user interface;
recording a first set of interaction information regarding user interaction of the user with the graphical user interface after receiving the help button selection;
dynamically updating the user profile based on the first set of interaction information;
predicting a predicted issue based on the user profile;
computing a confidence level that the predicted issue is the user-experienced issue;
updating the confidence level based on one or more responses received from the user comprising additional information relating to the user-experienced issue;
determining a likely resolution to the technical difficulty based at least in part on the user information, the issue-related information, the user profile, and the first set of interaction information and the list of help options;
calculating a plurality of representative rankings based at least in part on a first success rate of other representatives in resolving similar technical difficulties, an overall average time to resolve the similar technical difficulties, and the confidence level;
identifying one or more representatives in a tier that is above a representative threshold based on the plurality of representative rankings, wherein the tier that is above the representative threshold is indicative of a second success rate of the one or more representatives for resolving the user-experienced issue given the confidence level;
presenting to the user an option to select, in real time, between a highly-ranked representative in the tier that is above the representative threshold and a first-available representative, said first-available representative having a lower wait time than the highly-ranked representative but ranked lower than the highly-ranked representative;
in response to presenting the option, receiving a user input from the user whether to engage with the highly-ranked representative or the first-available representative;
automatically selecting for assignment to the user, a selected representative from the one or more representatives, based on the user input;
receiving user feedback from the user based on a user experience of the user with the selected representative;

updating a representative profile of the selected representative in real time based on a user satisfaction score from the user feedback and a category of the user-experienced issue, including updating a selected representative ranking corresponding to the category of the user-experienced issue based on the user feedback and a length of time to resolve the user-experienced issue; and further updating the user profile of the user based on the user feedback to improve a future prediction and recognize user trends.

9. The computerized method of claim 8, wherein the issue-related information is received from the user.

10. The computerized method of claim 8, further selecting the representative based at least in part on another length of time taken to resolve a similar technical difficulty.

11. The computerized method of claim 8, further selecting the selected representative based at least in part on a previously received user satisfaction score.

12. The computerized method of claim 8, further selecting the selected representative based at least in part on a tier designation of the one or more representatives.

13. The computerized method of claim 8, wherein the predicted issue is further determined from the user interaction with the graphical user interface prior to the help button selection.

14. The computerized method of claim 8, wherein the user profile is further based at least in part on information gathered from other users.

15. The computerized method of claim 8, wherein the user profile is further based at least in part on information gathered from an online database.

16. One or more non-transitory computer-readable media that store computer-executable instructions that, when executed by at least one processor, perform a method for matching a user to a representative for providing support to the user, comprising:
receiving issue-related information on user-experienced issue regarding use of a software application having a graphical user interface;
receiving user information;
creating a user profile based at least in part on the user information;
updating the user profile with the issue-related information;
updating the user profile with information related to other users with similar information,
receiving a help button selection from the user in the graphical user interface, the help button selection being responsive to the user encountering a technical difficulty;
presenting a list of help options to the user through the graphical user interface;
recording a first set of interaction information regarding user interaction of the user with the graphical user interface after receiving the help button selection;
dynamically updating the user profile based on the first set of interaction information;
predicting a predicted issue based on the user profile;
computing a confidence level that the predicted issue is the user-experienced issue;
updating the confidence level based on one or more responses received from the user comprising additional information relating to the user-experienced issue;
determining a likely resolution to the technical difficulty based at least in part on the user information, the issue-related information, the user profile, and the first set of interaction information and the list of help options;
calculating a plurality of representative rankings based at least in part on a first success rate of other representatives in resolving similar technical difficulties, an overall average time to resolve the similar technical difficulties, and the confidence level;
identifying one or more representatives in a tier that is above a representative threshold based on the plurality of representative rankings, wherein the tier that is above the representative threshold is indicative of a second success rate of the one or more representatives for resolving the user-experienced issue given the confidence level;
presenting to the user an option to select, in real time, between a highly-ranked representative in the tier that is above the representative threshold and a first-available representative said first-available representative having a lower wait time than the highly-ranked representative but ranked lower than the highly-ranked representative;
in response to presenting the option, receiving a user input from the user whether to engage with the highly-ranked representative or the first-available representative;
automatically selecting for assignment to the user, a selected representative from the one or more representatives, based on the user input;
receiving user feedback from the user based on a user experience of the user with the selected representative;
updating a representative profile of the selected representative in real time based on a user satisfaction score from the user feedback and a category of the user-experienced issue, including updating a selected representative ranking corresponding to the category of the user-experienced issue based on the user feedback and a length of time to resolve the user-experienced issue; and further updating the user profile of the user based on the user feedback to improve a future prediction and recognize user trends.

17. The one or more non-transitory computer-readable media of claim 16, wherein the user information is demographic information related to the user.

18. The one or more non-transitory computer-readable media of claim 16, wherein the predicted issue is further determined from a recorded user interaction with the graphical user interface prior to the help button selection.

19. The one or more non-transitory computer-readable media of claim 16, wherein the user profile is updated dynamically in real time based on manual editing by the user or a customer service representative.

20. The one or more non-transitory computer-readable media of claim 16, wherein the user profile further comprises further user information gathered from an online database.

* * * * *